(12) United States Patent
Shao et al.

(10) Patent No.: US 12,267,359 B2
(45) Date of Patent: Apr. 1, 2025

(54) APPLICATION IDENTIFICATION FOR PHISHING DETECTION

(71) Applicant: Palo Alto Networks, Inc., Santa Clara, CA (US)

(72) Inventors: Rongbo Shao, San Jose, CA (US); Bo Qu, Saratoga, CA (US); Zhanglin He, Sunnyvale, CA (US); Shengming Xu, San Jose, CA (US); Amy Lee, Milpitas, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 232 days.

(21) Appl. No.: 17/729,723

(22) Filed: Apr. 26, 2022

(65) Prior Publication Data

US 2023/0344866 A1 Oct. 26, 2023

(51) Int. Cl.
*H04L 9/40* (2022.01)
*H04L 51/21* (2022.01)
*H04L 61/5007* (2022.01)

(52) U.S. Cl.
CPC .......... *H04L 63/1483* (2013.01); *H04L 51/21* (2022.05); *H04L 61/5007* (2022.05); *H04L 63/1416* (2013.01)

(58) Field of Classification Search
CPC . H04L 63/1483; H04L 51/21; H04L 61/5007; H04L 63/1416; H04L 63/1408; H04L 63/1441; G06F 21/31; G06F 21/552
See application file for complete search history.

(56) References Cited

U.S. PATENT DOCUMENTS

| | | | | |
|---|---|---|---|---|
| 8,549,623 | B1* | 10/2013 | Cooley | G06F 21/56 713/153 |
| 10,021,133 | B1* | 7/2018 | Lakshmanan | H04L 63/1483 |
| 10,462,180 | B1* | 10/2019 | Ben David | H04L 63/0823 |
| 11,438,377 | B1* | 9/2022 | Azarafrooz | G06N 3/08 |
| 2007/0055749 | A1* | 3/2007 | Chien | H04L 63/1491 709/219 |
| 2010/0083383 | A1* | 4/2010 | Adler | G06F 21/54 726/26 |
| 2021/0144174 | A1* | 5/2021 | N | G06N 20/00 |
| 2021/0312041 | A1* | 10/2021 | Gururajan | G06F 21/554 |
| 2021/0377301 | A1* | 12/2021 | Desai | G06F 21/577 |

OTHER PUBLICATIONS

Zahra et al., Detecting Covid-19 Chaos Driven Phishing/Malicious URL Attacks by a Fuzzy Logic and Data Mining Based Intelligence System, Egyptian Informatics Journal, vol. 23, No. 2, Dec. 14, 2021, pp. 197-214.

(Continued)

*Primary Examiner* — Abdulkader M Alriyashi
(74) *Attorney, Agent, or Firm* — Van Pelt, Yi & James LLP

(57) ABSTRACT

Techniques for application identification for phishing detection are disclosed. In some embodiments, a system/process/computer program product for application identification for phishing detection includes monitoring network activity associated with a session to detect a request to access a site; determining advanced application identification associated with the site; and identifying the site as a phishing site based on the advanced application identification.

18 Claims, 10 Drawing Sheets

(56) References Cited

OTHER PUBLICATIONS

Almseidin et al., Phishing Detection Based on Machine Learning and Feature Selection Methods, vol. 13, No. 12, 2019, pp. 171-182.
Sahingoz et al., Machine Learning Based Phishing Detection from URLS, Expert Systems with Applications, 117, (2019), pp. 345-357.
Shahrivari et al., Phishing Detection Using Machine Learning Techniques, Sep. 20, 2020.
Yadollahi et al., An Adaptive Machine Learning Based Approach for Phishing Detection Using Hybrid Features, 2019.
Zuraiq et al., Review: Phishing Detection Approaches, 2019 IEEE.

\* cited by examiner

APPLICATION IDENTIFICATION FOR PHISHING DETECTION

BACKGROUND OF THE INVENTION

A firewall generally protects networks from unauthorized access while permitting authorized communications to pass through the firewall. A firewall is typically a device or a set of devices, or software executed on a device, such as a computer, which provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1:
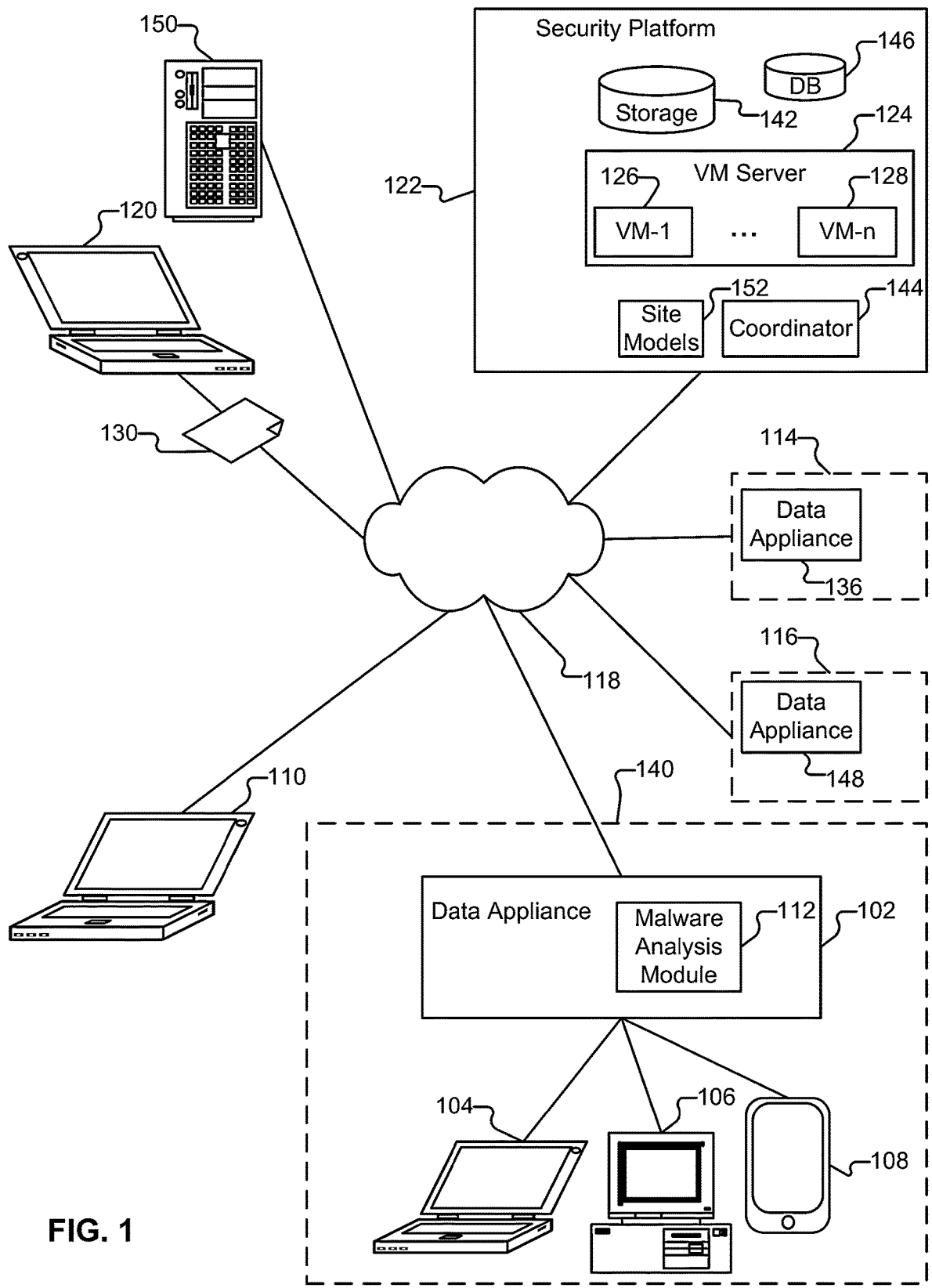
FIG. 1 illustrates an example of an environment in which malicious applications are detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall/security rules or firewall/security policies, which can be triggered based on various criteria, such as described herein). A firewall may also apply anti-virus protection, malware detection/prevention, or intrusion protection by applying a set of rules or policies.

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QoS), workload balancing of network related resources, and/or other networking functions), and/or other functions. For example, routing functions can be based on source information (e.g., source IP address and port), destination information (e.g., destination IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series next generation firewalls, Palo Alto Networks' VM Series virtualized next generation firewalls, and CN Series container next generation firewalls).

For example, Palo Alto Networks' next generation firewalls enable enterprises and service providers to identify and control applications, users, and content—not just ports, IP addresses, and packets—using various identification technologies, such as the following: App-ID™ (e.g., App ID) for accurate application identification, User-ID™ (e.g., User ID) for user identification (e.g., by user or user group), and Content-ID™ (e.g., Content ID) for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency for Palo Alto Networks' PA Series next generation firewalls).

Overview of Techniques for Application Identification for Phishing Detection

Phishing is an increasing security threat with approximately 1.5 million new phishing sites identified each month. Specifically, we have witnessed a significant increase in phishing attacks since the Covid-19 pandemic began in late 2019 (e.g., which resulted in a greater number of enterprises to allow employees and contractors to work (remotely) from home).

Existing approaches to detecting phishing attacks have various shortcomings. For example, pattern matching-based signature detection approaches are generally prone to false positives (FPs), because of the high similarity between an original web page of a target site and the phishing page attempting to emulate/mimic that target site (e.g., as such phishing pages are typically created to mimic the original web page, such as a login page for a banking site, e-commerce site, streaming site, etc.). As another example, URL-based detection approaches generally require an offline analyzer to observe the exact same page as the customer (e.g., as the enterprise firewall of the customer, but such is often not the case based on various cloaking techniques using geolocation targets, such as only the German location targets will receive the phishing page as opposed to customers elsewhere in Europe, etc., and if the security service provider has its servers located in a different geolocation than the target location, then such will not result in the phishing site being presented for security analysis such as by the security service provider's cloud-based security platform that may perform URL or other security analysis).

Thus, new and improved techniques for detecting phishing are needed.

As such, various techniques for application identification (App-ID) for phishing detection are disclosed. For example, the disclosed techniques facilitate integrating the use of advanced application identification (App-ID) (e.g., as used herein, advanced application identification (App-ID) includes (1) an identification of a protocol (e.g., HTTP, HTTPS, SSL, TLS, etc.) and (2) an identification of the web site based on analysis of the content of the web page, generally referred to herein as site similarity) in combination with various other techniques to provide for more efficient and effective phishing detection (e.g., increased coverage and lower FP rates) as will be described herein.

In some embodiments, a system/process/computer program product for application identification for phishing detection includes monitoring network activity associated with a session to detect a request to access a site; determining advanced application identification associated with the site; and identifying the site as a phishing site based on the advanced application identification.

For example, the disclosed techniques for application identification for phishing detection can be performed to facilitate more effective and efficient inline detection and blocking of phishing sites (e.g., at a security platform, such as a perimeter firewall). The disclosed techniques also facilitate improved phishing detection rates as compared with existing standalone approaches. Moreover, the disclosed techniques result in a lower FP rate using such a combination of detection techniques with application identification (e.g., as opposed to existing approaches that are merely performing an analysis of the web page content alone) as will also be further described below.

Accordingly, new and improved security solutions that facilitate applying application identification for phishing detection using a security platform (e.g., a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) are disclosed in accordance with some embodiments.

These and other embodiments and examples for applying application identification for phishing detection will be further described below.

Example System Architectures for Application Identification for Phishing Detection Accordingly, in some embodiments, the disclosed techniques include providing a security platform (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, such as PANOS executing on a virtual/physical NGFW solution commercially available from Palo Alto Networks, Inc. or another security platform/NFGW, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) configured to provide DPI capabilities (e.g., including stateful inspection) of, for example, applying App-ID for phishing detection based on a policy (e.g., layer-7 security and/or other security policy enforcement) as further described below.

FIG. 1 illustrates an example of an environment in which malicious applications ("malware") are detected and prevented from causing harm. As will be described in more detail below, malware classifications (e.g., as made by security platform 122) can be variously shared and/or refined among various entities included in the environment shown in FIG. 1. And, using techniques described herein, devices, such as endpoint client devices 104-110 can be protected from such malware (e.g., including phishing related malware).

"Malware" as used herein refers to an application that engages in behaviors, whether clandestinely or not (and whether illegal or not), of which a user does not approve/would not approve if fully informed. Examples of malware include ransomware, Trojans, viruses, rootkits, spyware, hacking tools, etc. One example of malware is a desktop application that encrypts a user's stored data (e.g., ransomware). Another example of malware is a desktop application that collects and reports to a remote server the end user's activities and/or various information associated with the user (e.g., spyware). Other forms of malware can also be detected/thwarted using the improved phishing detection techniques as will be further described herein (e.g., keyloggers).

The term "phishing" is used throughout the Specification to collectively refer to messages, such as electronic mail (email) messages, text messages, and/or various other types of messages, such as via social or work productivity related messaging platforms, where an attacker sends a fraudulent message (e.g., spoofed, fake, or otherwise deceptive content and/or web links) designed to trick a user/person into performing an action to facilitate malicious and/or undesired activities (e.g., reveal sensitive information to the attacker, such as login information or other personal/confidential information or credentials, or to facilitate a download of malware, such as by visiting a spoofed web site, deployment of malware on the user's infrastructure, such as ransomware, etc.). As further discussed herein, detection of phishing activities is increasingly a technical challenge as phishing attacks have become more sophisticated and often transparently mirror the site (e.g., web site) being targeted, allowing the attacker to observe everything while the victim is navigating the site, and transverse any additional security boundaries with the victim.

Techniques described herein can be used in conjunction with a variety of platforms (e.g., desktops, mobile devices, gaming platforms, embedded systems, etc.) and/or a variety of forms of phishing attacks (e.g., via electronic mail (email) messages, text messages, and/or various other types of messages, such as via social or work productivity related messaging platforms, etc.). In the example environment shown in FIG. 1, client devices 104-108 are a laptop computer, a desktop computer, and a tablet (respectively) present in an enterprise network 140. Client device 110 is a laptop computer present outside of enterprise network 140.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

Figure 2A:
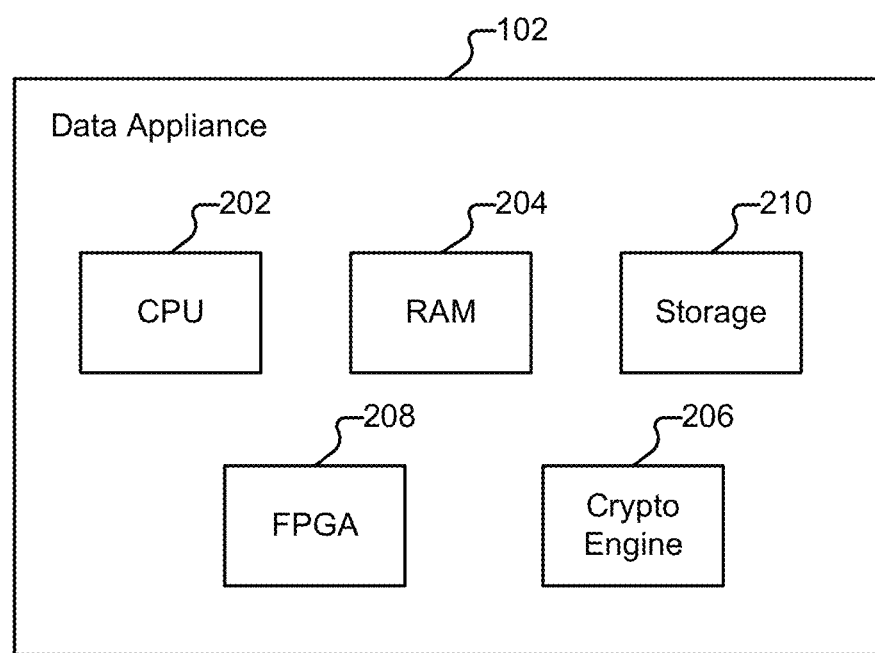
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 140 and implementing disclosed techniques. Examples of such information include application identifiers, content identifiers, user identifiers, requested URLs, IP address mappings, policy and other configuration information, signatures, hostname/URL categorization information, malware profiles, and machine learning models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 110) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing-Social Networking; Web Browsing-News; SSH; and so on. As will also be further described herein, the application identification engine disclosed herein can perform advanced application identification. Specifically, advanced application identification includes both identifying an application (e.g., using various application signatures for identifying applications based on packet flow analysis) as well as identifying a target site based on a site similarity analysis (e.g., a site similarity analysis of a target site and a potential phishing site, such as further described herein).

Figure 2B:
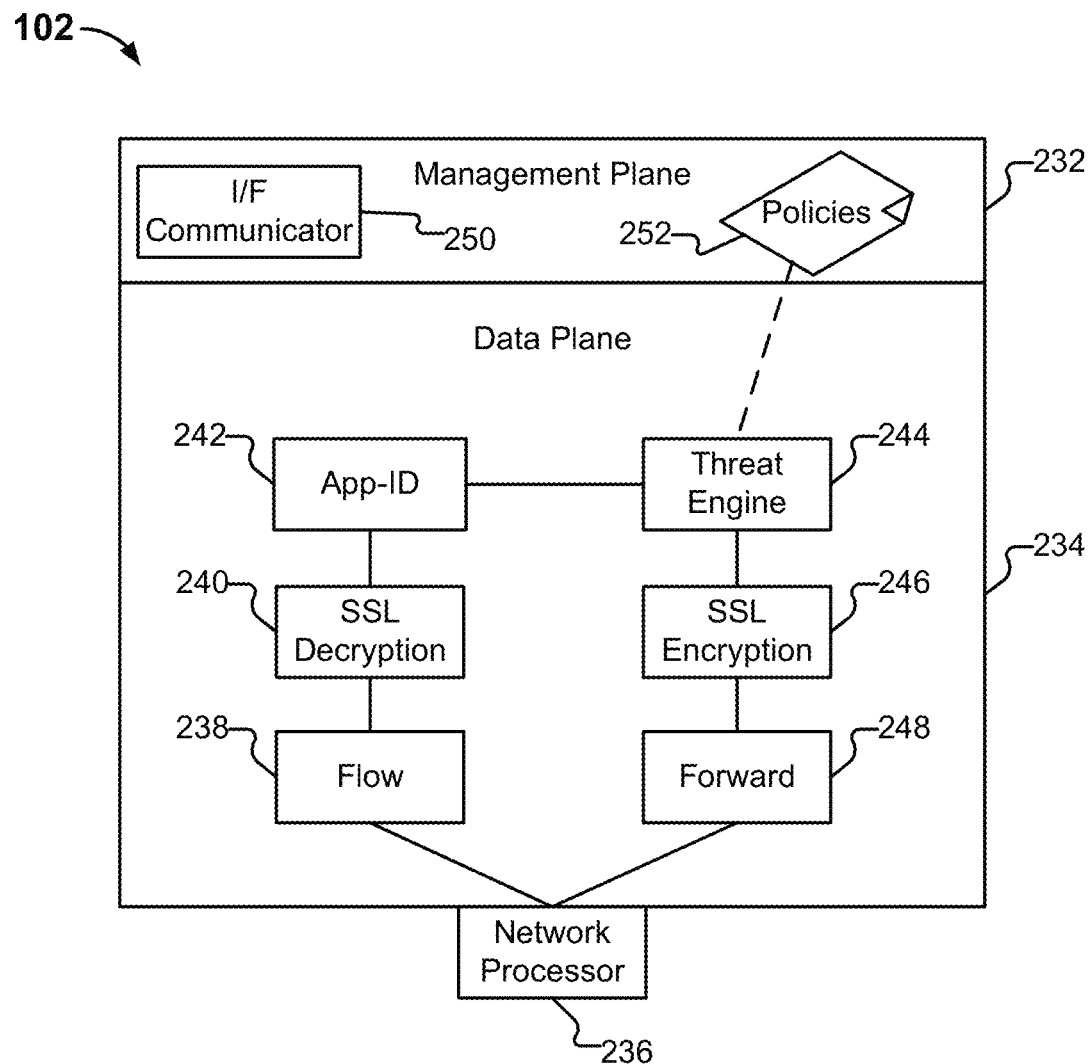
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, such as a web browsing session, the identified application can change, and such changes will be noted by data appliance 102. For example, a user may initially browse to a corporate Wiki (classified based on the URL visited as "Web Browsing-Productivity") and then subsequently browse to a social networking site (classified based on the URL visited as "Web Browsing-Social Networking"). Distinct types of protocols have corresponding decoders. In addition, the application identification engine disclosed herein can perform advanced application identification. Specifically, advanced application identification includes both identifying an application (e.g., using various application signatures for identifying applications based on packet flow analysis as similarly described above) as well as identifying a target site based on a site similarity analysis (e.g., a site similarity analysis of a target site and a potential phishing site, such as will be further described below).

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. Example policies can include phishing detection policies using the disclosed advanced application identification techniques in combination with one or more other parameters (e.g., IP address(es) associated with the site, geolocation information associated with the site/IP address(es), and/or other information, such as further described below). An interface (I/F) communicator 250 is provided for management communications (e.g., via (REST) APIs, messages, or network protocol communications or other communication mechanisms).

Security Platform

Returning to FIG. 1, suppose a malicious individual (using system 120) has created malware 130 (e.g., such as delivered to endpoint devices of users via a phishing site, in which the URL for the phishing site is sent to targeted users in the content of an email). The malicious individual hopes that a client device, such as client device 104, will execute a copy of malware 130, compromising the client device, and, e.g., causing the client device to become a bot in a botnet. The compromised client device can then be instructed to perform tasks (e.g., cryptocurrency mining, or participating in denial of service attacks) and to report information to an external entity, such as command and control (C&C) server 150, as well as to receive instructions from C&C server 150, as applicable.

Suppose data appliance 102 has intercepted an email sent (e.g., by system 120) to a user, "Alice," who operates client device 104. In this example, Alice receives the email and clicks on the link to a phishing site that could result in an attempted download of malware 130 by Alice's client device 104. However, in this example, data appliance 102 can perform the disclosed application identification for phishing and block access from Alice's client device 104 to the phishing site to thereby preempt and prevent any such download of malware 130 to Alice's client device 104. As will be further described below, data appliance 102 performs advanced application identification and can use additional information associated with the target site (e.g., IP address(es) associated with the site, geolocation information associated with the site/IP address(es), and/or other information, such as further described below) to detect and block such phishing attempts.

In various embodiments, data appliance 102 is configured to work in cooperation with security platform 122. As one example, security platform 122 can provide to data appliance 102 a set of signatures of known-malicious files (e.g., as part of a subscription). If a signature for malware 130 is included in the set (e.g., an MD5 hash of malware 130), data appliance 102 can prevent the transmission of malware 130 to client device 104 accordingly (e.g., by detecting that an MD5 hash of the email attachment sent to client device 104 matches the MD5 hash of malware 130). Security platform 122 can also provide to data appliance 102 a list of known malicious domains and/or IP addresses, allowing data appliance 102 to block traffic between enterprise network 140 and C&C server 150 (e.g., where C&C server 150 is known to be malicious). The list of malicious domains (and/or IP addresses) can also help data appliance 102 determine when one of its nodes has been compromised. For example, if client device 104 attempts to contact C&C server 150, such attempt is a strong indicator that client 104 has been compromised by malware (and remedial actions should be taken accordingly, such as quarantining client device 104 from communicating with other nodes within enterprise network 140). As will be described in more detail below, security platform 122 can also provide other types of information to data appliance 102 (e.g., as part of a subscription) such as a set of information for performing advanced application identification for phishing (e.g., target site information for performing site similarity, IP address(es) associated with the site, geolocation information associated with the site/IP address(es), and/or other information, such as further described below) usable by data appliance 102 to perform inline analysis of files.

A variety of actions can be taken by data appliance 102 if no signature for an attachment is found, in various embodiments. As a first example, data appliance 102 can fail-safe, by blocking transmission of any attachments not whitelisted as benign (e.g., not matching signatures of known good files). A drawback of this approach is that there may be many legitimate attachments unnecessarily blocked as potential malware when they are in fact benign. As a second example, data appliance 102 can fail-danger, by allowing transmission of any attachments not blacklisted as malicious (e.g., not matching signatures of known bad files). A drawback of this approach is that newly created malware (previously unseen by platform 122) will not be prevented from causing harm. As a third example, data appliance 102 can be configured to provide the file (e.g., malware 130) to security platform 122 for static/dynamic analysis, to determine whether it is malicious and/or to otherwise classify it.

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliances can be configured to automatically block the file download based on the analysis result. Further, a signature can be generated for the malware and distributed (e.g., to data appliances such as data appliances 102, 136, and 148) to automatically block future file transfer requests to download the file determined to be malicious.

In various embodiments, security platform 122 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, security platform 122 can optionally perform static/dynamic analysis in cooperation with one or more virtual machine (VM) servers, such as VM server 124.

An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available results of its analysis of samples via a list of signatures (and/or other identifiers) to data appliance 102 as part of a subscription. For example, security platform 122 can periodically send a content package that identifies malware files, phishing sites, etc. (e.g., daily, hourly, or some other interval, and/or based on an event configured by one or more policies). An example content package includes a listing of identified phishing sites, with information such as a target site name, URL, and site similarity information, as well as various other information for each target site (e.g., IP address(es) associated with the target site, geolocation information associated with the site/IP address(es), and/or other information, such as further described below). The subscription can cover the analysis of just those files intercepted by data appliance 102 and sent to security platform 122 by data appliance 102, and can also cover signatures of malware known to security platform 122. As will be described in more detail below, platform 122 can also make available other types of information for phishing detection using site models 152, which is performed using the disclosed advanced application identification techniques that can help data appliance 102 detect and perform inline blocking of phishing sites.

In various embodiments, security platform 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install software on client device 110 that communicates with security platform 122 (e.g., to receive content packages from security platform 122, use the received content packages to check attachments in accordance with techniques described herein, and transmit applications to security platform 122 for analysis).

Analyzing Samples Using Static/Dynamic Analysis

Figure 3:
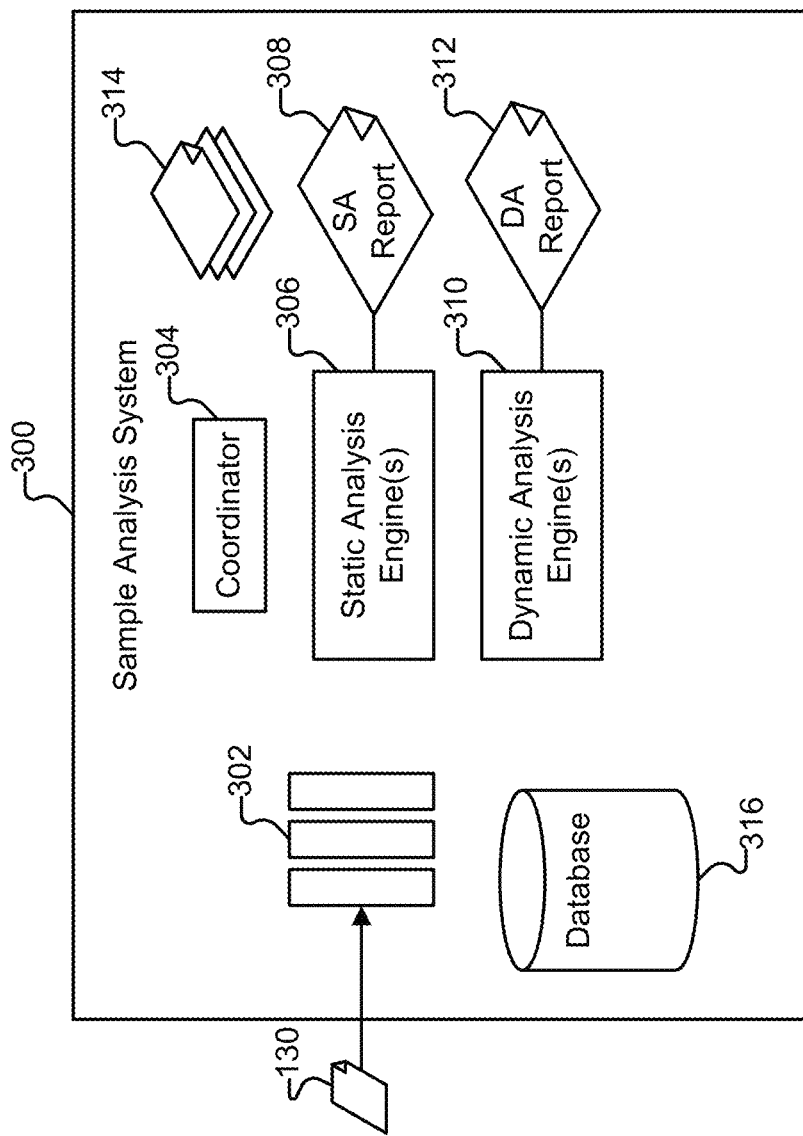
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module 112 incorporated into data appliance 102. Analysis system 300 can also be implemented, collectively, across multiple distinct devices. For example, the functionality of analysis system 300 can be provided by security platform 122.

In various embodiments, analysis system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C&C) domains; signatures, hashes, and/or other identifiers of known malicious applications; signatures, hashes, and/or other identifiers of known safe applications; signatures, hashes, and/or other identifiers of known malicious files (e.g., OS exploit files); signatures, hashes, and/or other identifiers of known safe libraries; and signatures, hashes, and/or other identifiers of known malicious libraries.

In various embodiments, when a new sample is received for analysis (e.g., an existing signature associated with the sample is not present in analysis system 300), it is added to queue 302. As shown in FIG. 3, application 130 is received by system 300 and added to queue 302.

Coordinator 304 monitors queue 302, and as resources (e.g., a static analysis worker) become available, coordinator 304 fetches a sample from queue 302 for processing (e.g., fetches a copy of malware 130). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. As an example, static analysis of a target site can include site information for performing a site similarity analysis for performing the disclosed techniques for phishing detection. In some embodiments, the collected information is stored in a database record for the sample (e.g., in database 316), instead of or in addition to a separate static analysis report 308 being created (i.e., portions of the database record form the report 308). In some embodiments, the static analysis engine also forms a verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance. In some embodiments, results of static analysis (e.g., performed by static analysis engine 306), whether in report form (308) and/or as stored in database 316, or otherwise stored, are provided as input to dynamic analysis engine 310. For example, the static report information can be used to help select/customize the virtual machine instance used by dynamic analysis engine 310 (e.g., Microsoft Windows 7 SP 2 vs. Microsoft Windows 10 Enterprise, or iOS 11.0 vs. iOS 12.0). Where multiple virtual machine instances are executed at the same time, a single dynamic analysis engine can manage all of the instances, or multiple dynamic analysis engines can be used (e.g., with each managing its own virtual machine instance), as applicable. As will be explained in more detail below, during the dynamic portion of the analysis, actions taken by the application (including network activity) are analyzed.

In various embodiments, static analysis of a sample is omitted or is performed by a separate entity, as applicable.

As one example, traditional static and/or dynamic analysis may be performed on files by a first entity. Once it is determined (e.g., by the first entity) that a given file is malicious, the file can be provided to a second entity (e.g., the operator of security platform 122) specifically for additional analysis with respect to the malware's use of network activity (e.g., by a dynamic analysis engine 310).

The environment used by analysis system 300 is instrumented/hooked such that behaviors observed while the application is executing are logged as they occur (e.g., using a customized kernel that supports hooking and logcat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities.

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

Advanced Application Identification for Phishing Detection

Figure 4:
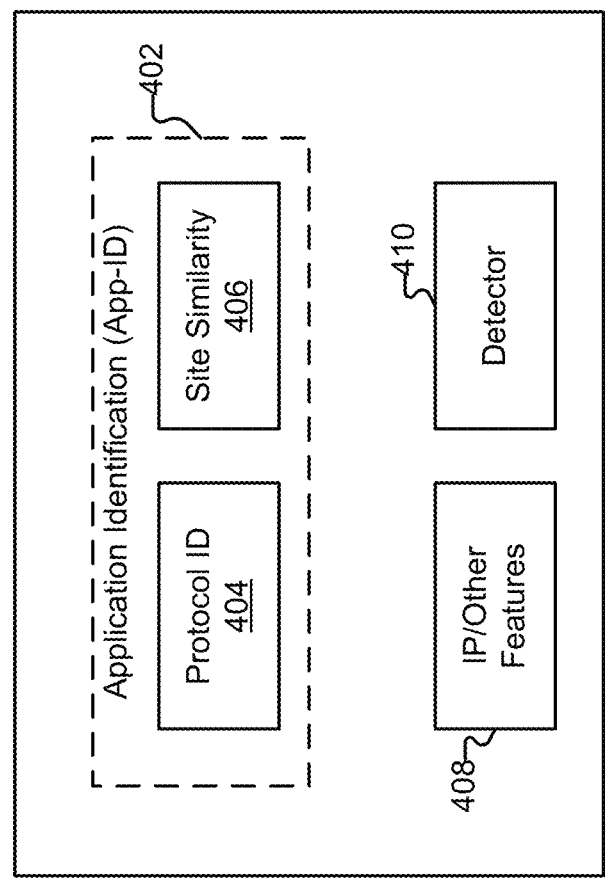
FIG. 4 illustrates portions of an example embodiment of a threat detection engine using application identification in accordance with some embodiments.

FIG. 4 illustrates portions of an example embodiment of a threat detection engine using application identification in accordance with some embodiments. As similarly discussed above, in various embodiments, data appliance 102 includes a threat engine 244. The threat engine includes an application identification (App-ID) engine 402 that performs advanced application identification. As such, App-ID engine 402 incorporates both protocol decoding 404 for application identification as well as site similarity matching 406 during a respective decoder stage and pattern match stage performed inline at data appliance 102. Results of the two stages are merged by a detector stage as shown at 410. In some embodiments, detector 410 also utilizes IP address information and/or other features as shown at 408 in combination with the advanced application identification information for detecting phishing sites (e.g., combining advanced application identification with IP, URL, and/or domain anomaly detection features, such as further described below).

When data appliance 102 receives a packet, data appliance 102 performs a session match to determine to which session the packet belongs (allowing data appliance 102 to support concurrent sessions). Each session has a session state which implicates a particular protocol decoder (e.g., a web browsing decoder, an FTP decoder, or an SMTP decoder). When a file is transmitted as part of a session, the applicable protocol decoder can make use of an appropriate file-specific decoder (e.g., a PE file decoder, a JavaScript decoder, or a PDF decoder).

Site similarity is performed based on a periodic static analysis of target sites that are analyzed for caching a visual representation of the expected target sites for subsequent pattern matching comparison analysis with potential phishing sites. In an example implementation, the similarity analysis of sites is performed by abstracting the web page code, which can include, for example, title, header, footer, form elements, copyright information, and/or other fields and information.

In some embodiments, the disclosed techniques for phishing detection implemented using the threat detection engine shown in FIG. 4 include combining application identification with IP, URL, and/or domain anomaly detection features.

As a first example, phishing detection can be performed using application identification in combination with a pattern match (e.g., site similarity pattern matching as described herein). For example, advanced application identification includes performing application identification in combination with site similarity to improve phishing detection, which can reduce false positives as compared with phishing detection techniques that rely solely on pattern matching of site similarity. As such, the disclosed advanced application identification techniques for phishing detection include using application identification for identifying hosting servers as prefilter for pattern-based site similarity detection (e.g., the prefilter can be used to reduce the load for performing pattern matching, which will facilitate better performance for implementing the disclosed techniques).

As a second example, phishing detection can be performed using advanced application identification in combination with an IP address range associated with the target site (e.g., the legitimate/verified Amazon Web Services (AWS) site). Many web services have servers in a fixed range of IP addresses. As such, if the advanced application identification identifies a web page(s) of a potential phishing site to be similar to the target site (e.g., the legitimate/verified Amazon Web Services (AWS) site, sign in web page) based on site similarity detection, but if these servers associated with the potential phishing site have IP addresses outside of the known IP address range associated with the target site, then the threat detection engine can identify the potential phishing site as likely phishing.

As a third example, phishing detection can be performed using advanced application identification in combination with a URL category associated with the target site (e.g., the legitimate/verified Amazon Web Services (AWS) site). It is generally observed that many phishing sites change domains frequently. As such, for web page content that is deemed to appear to be similar to a well-known site (e.g., the AWS site, in which various well-known sites, such as the top 100 or top 1,000 or top 10,000, etc. sites can be periodically monitored to generate site similarity information for performing such site similarity analysis), but if the potential phishing site is associated with a newly registered domain category (e.g., various URL related services that are available publicly and/or commercially can provide information regarding the domain name registration date information), then the threat detection engine can identify the potential phishing site as likely phishing.

Example Use Cases of Application Identification for Phishing Detection

Figure 5A:
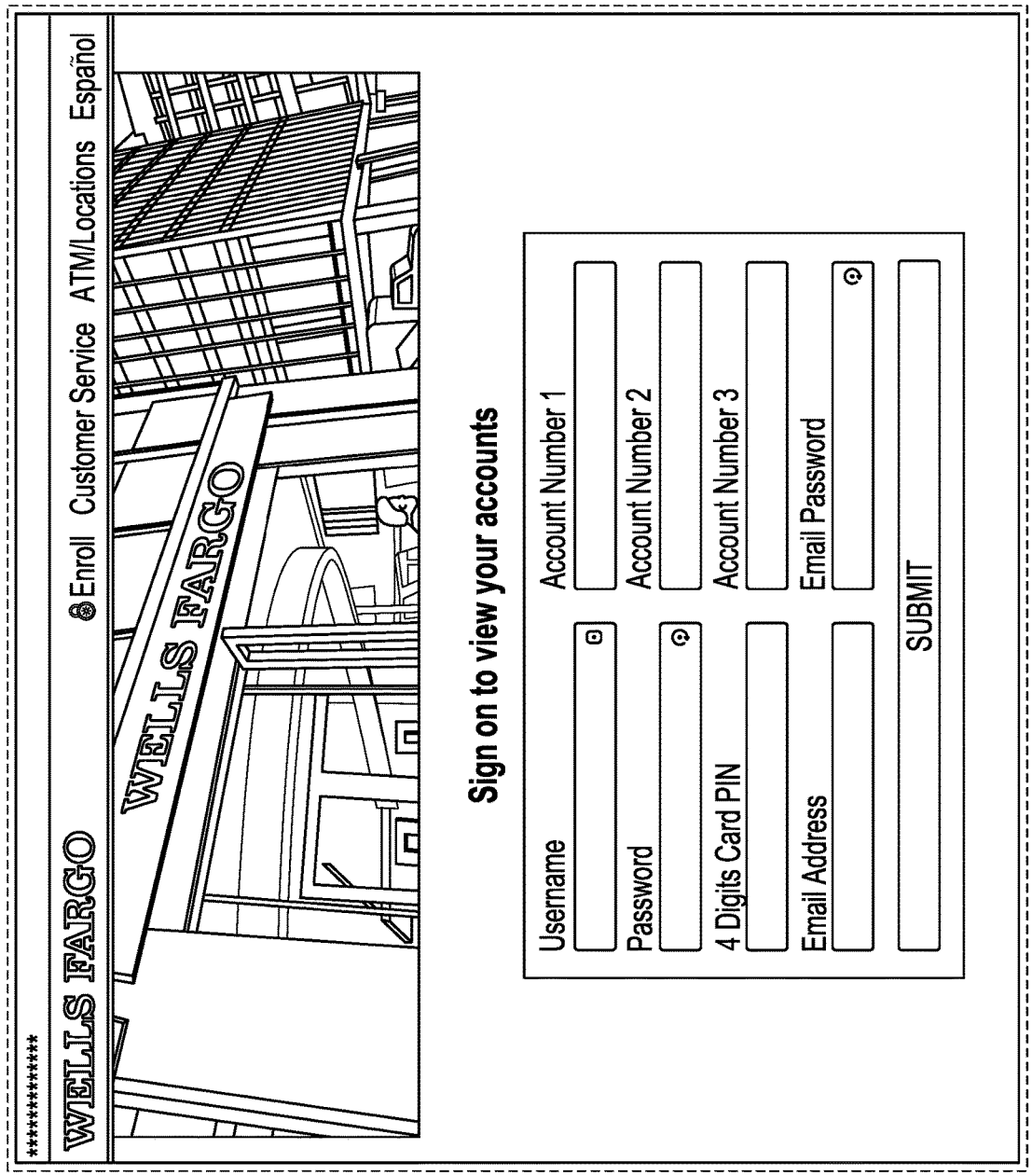
FIGS. 5A-5C illustrate example phishing sites that can be detected using application identification for phishing detection in accordance with some embodiments.
Figure 5B:
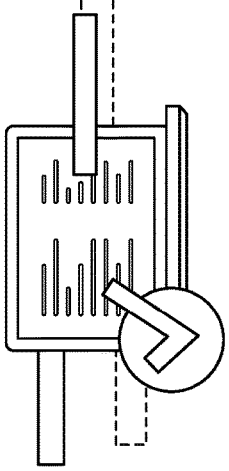
Figure 5C:
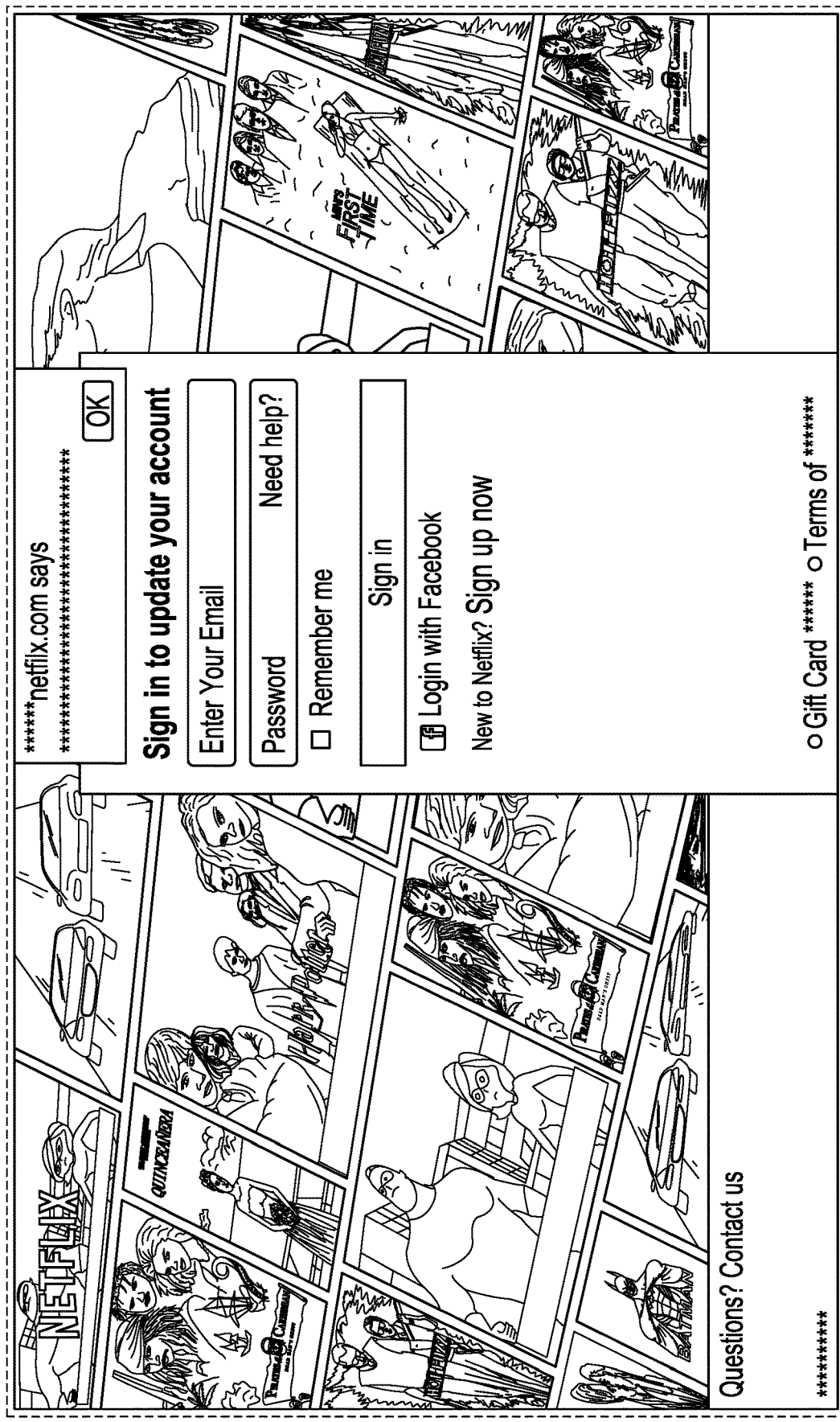

FIGS. 5A-5C illustrate example phishing sites that can be detected using application identification for phishing detection in accordance with some embodiments. For example, the disclosed techniques for application identification for phishing detection can be implemented to be performed using inline malware detection, such as on data appliance 102 (e.g., and/or on endpoints, such as client devices 104, 106, and 108, using a security agent executed on the protected endpoint, and can also be performed as cloud-based security service, such as using security platform 122, as described herein).

Referring to FIG. 5A, an example web page of a Wells Fargo Bank phishing site is illustrated. However, the disclosed techniques can perform advanced application identification to identify such example phishing sites. In this example, the potential phishing site is at hXXps://storage[.]lgoogleapis[.]com/awells-putlogs-308643420/index[.]html. As such, traffic directed to this address (e.g., Uniform Resource Identifier (URI)/Uniform Resource Locator (URL)) will be identified as "google-cloud-storage" using the disclosed advanced application identification techniques (e.g., implemented by Protocol ID component 404 of App-ID engine 402 as shown in FIG. 4). In addition, using the disclosed site similarity based on pattern matching to detect a web page as appearing to be similar to a Wells Fargo Bank login page, which is also performed using the disclosed advanced application identification techniques (e.g., implemented by Site Similarity component 406 of App-ID engine 402 as shown in FIG. 4) on hosting App-IDs or storage App-IDs, can be used by detector 410 of threat detection engine 244 to efficiently and effectively detect this phishing site (e.g., and similar such phishing sites) as the threat detection engine (e.g., threat detection engine 244 of FIG. 4) is configured to identify such well-known sites that are not legitimately located on hosting App-IDs or storage App-IDs as phishing sites.

Referring to FIG. 5B, an example web page of an AWS phishing site is illustrated.

However, the disclosed techniques can perform advanced application identification in combination with an IP address range verification feature to detect such example phishing sites. As such, when applying the advanced application identification in combination with an IP address range verification to a phishing site, such as https://howitfix[.]com/app/aws/, then the IP address(es) associated with this example phishing site will not resolve to the known AWS associated IP address ranges (e.g., as this phishing site is not even owned by Amazon, in which AWS has a given set of IP address ranges that are publicly available at https://ip-ranges.amazonaws.com/ip-ranges.json, which can be periodically updated and stored in IP/other features component 408 of threat detection engine 244). Therefore, identifying a potential phishing site as appearing to be similar to AWS sites and then checking its IP address range can be used by detector 410 of threat detection engine 244 to efficiently and effectively detect this phishing site (e.g., and similar such phishing sites).

Referring to FIG. 5C, an example web page of a Netflix phishing site is illustrated. However, the disclosed techniques can perform advanced application identification in combination with another feature to determine if the potential phishing site is a newly registered domain. In this example, the domain of the potential phishing site, Canada-neflxt[.]com, is a recently registered domain (e.g., less than 1 day, 1 week, 1 month, or some other threshold for recently registered domains can similarly be used for this feature). In this example, when the threat engine identifies a potential phishing site as similar to a well-known site, Netflix, but as in this example, the URL category shows this site as a newly registered domain (NRD) (e.g., NRD information can be periodically updated and stored in IP/other features component 408 of threat detection engine 244), then detector 410 of threat detection engine 244 can use this additional NRD attribute to efficiently and effectively detect this phishing site (e.g., and similar such phishing sites).

Additional example processes for the disclosed techniques for application identification for phishing detection will now be described.

Example Processes for Application Identification for Phishing Detection

Figure 6:
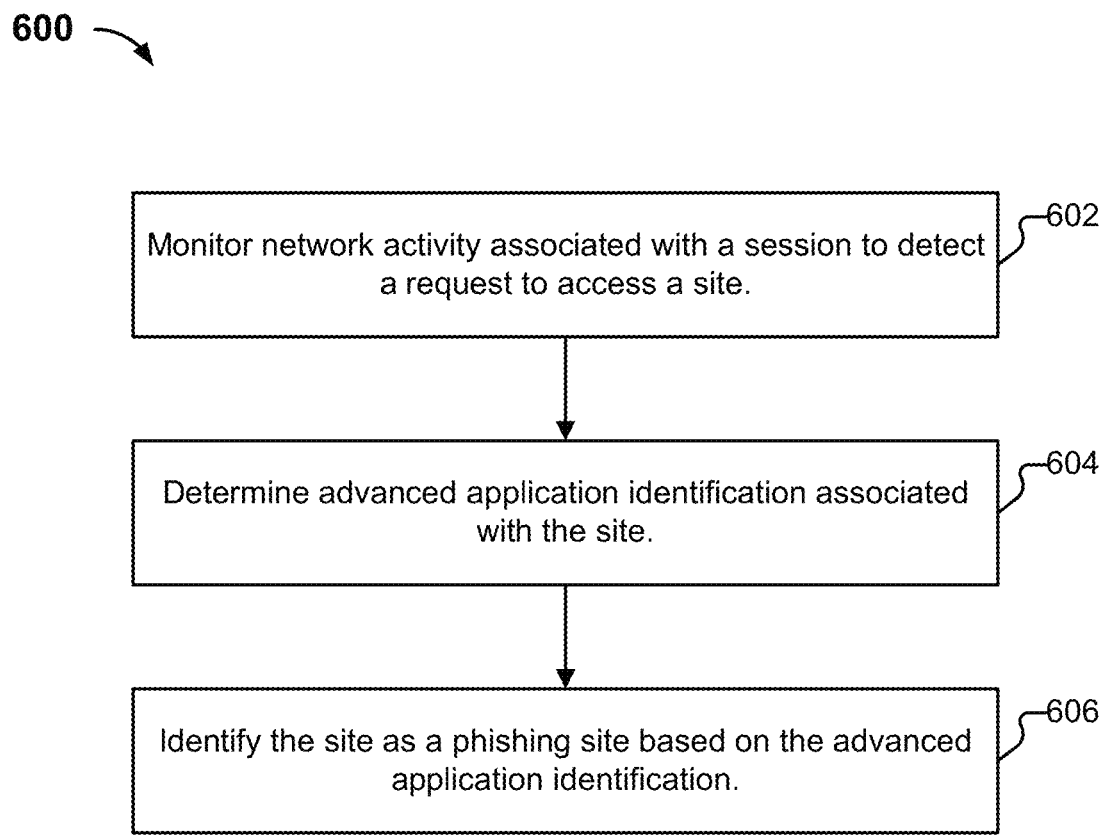
FIG. 6 is a flow diagram of a process for application identification for phishing detection in accordance with some embodiments.

FIG. 6 is a flow diagram of a process for application identification for phishing detection in accordance with some embodiments. In some embodiments, a process 600 as shown in FIG. 6 is performed by the security platform and techniques as similarly described above including the embodiments described above with respect to FIGS. 1-5C. In one embodiment, process 600 is performed by data appliance 102 as described above with respect to FIG. 1, security platform 122 as described above with respect to FIG. 1 (e.g., as a cloud-based security service), a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 602, monitoring network activity associated with a session to detect a request to access a site is performed. For example, data appliance 102 can be configured to monitor the session and detect the request to access the site as similarly described above with respect to FIGS. 1-2B.

At 604, determining advanced application identification associated with the site is performed. For example, the advanced application identification can be performed using protocol ID component 404 and site similarity component 406 of threat detection engine 244 as similarly described above with respect to FIG. 4 and FIG. 5A.

At 606, identifying the site as a phishing site based on the advanced application identification is performed. For example, policy enforcement can include blocking the session from accessing the phishing site, logging the attempted access to the phishing site, monitoring and logging access to the phishing site, warning a user prior to allowing access to the phishing site, and/or other actions/responses or combinations thereof can be performed based on the policy (e.g., phishing/security policy, which can be stored in policies 252 as shown in FIG. 2B).

Figure 7:
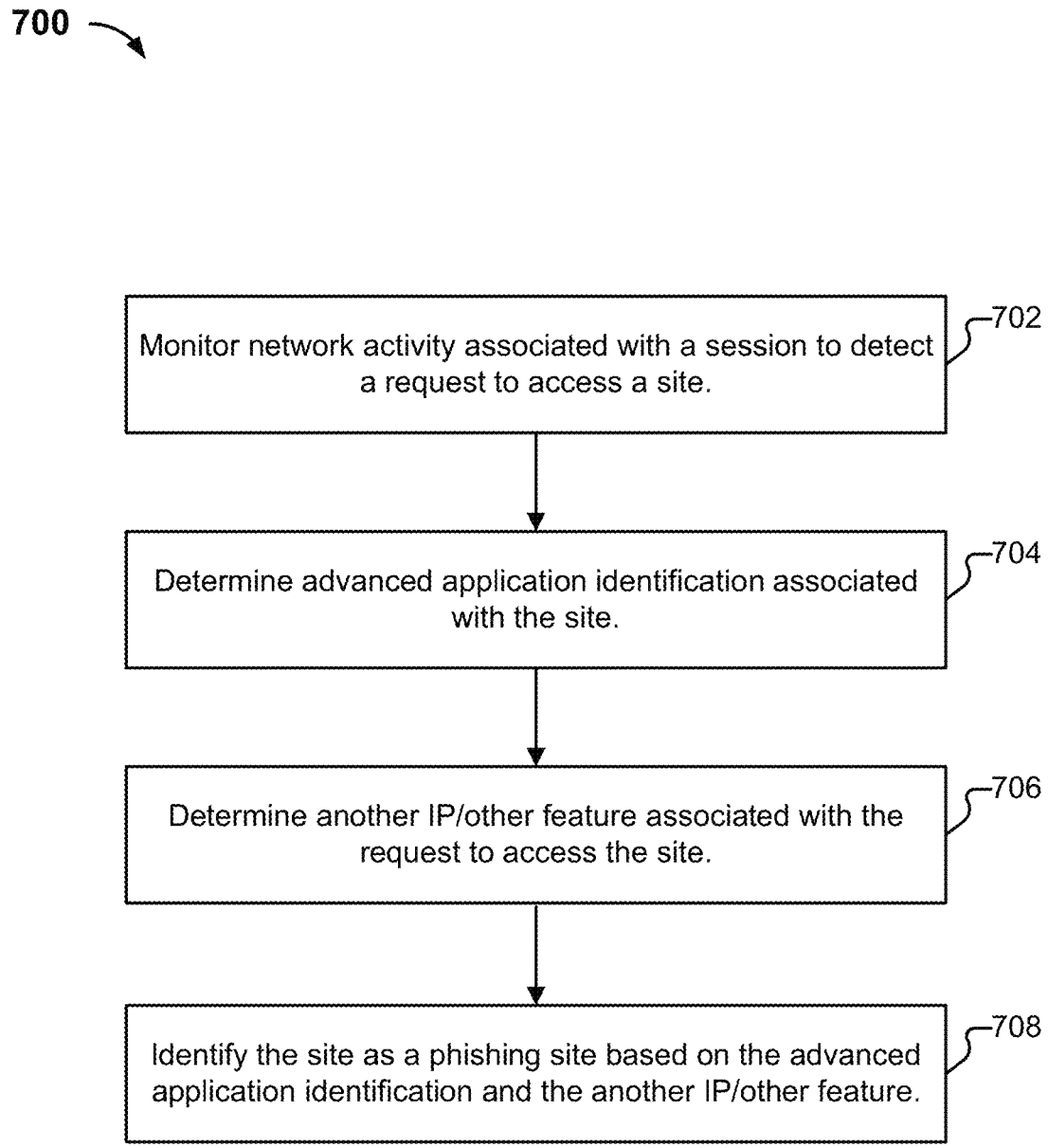
FIG. 7 is another flow diagram of a process for application identification for phishing detection in accordance with some embodiments.

FIG. 7 is another flow diagram of a process for application identification for phishing detection in accordance with some embodiments. In some embodiments, a process 700 as shown in FIG. 7 is performed by the security platform and techniques as similarly described above including the embodiments described above with respect to FIGS. 1-5C. In one embodiment, process 700 is performed by data appliance 102 as described above with respect to FIG. 1, security platform 122 as described above with respect to FIG. 1 (e.g., as a cloud-based security service), a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 702, monitoring network activity associated with a session to detect a request to access a site is performed. For example, data appliance 102 can be configured to monitor the session and detect the request to access the site as similarly described above with respect to FIGS. 1-2B.

At 704, determining advanced application identification associated with the site is performed. For example, the advanced application identification can be performed using protocol ID component 404 and site similarity component 406 of threat detection engine 244 as similarly described above with respect to FIG. 4 and FIG. 5A.

At 706, determine IP/other features associated with the request to access the site. For example, the determination of IP/other features (e.g., IP address(es)/range, NRD information, URL category information, etc.) associated with the request to access the site can be performed using IP/other features component 408 of threat detection engine 244, such as similarly described above with respect to FIG. 4 and FIGS. 5B and 5C. For example, the advanced application identification can include a protocol identification that identifies the phishing site based at least in part on using a URL category, wherein the URL category is selected using a URL categorization based on an extracted domain associated with the request to access the site (e.g., URL categorization can be obtained from the firewall using a URL categorization solution/service, such as PanDB commercially available from Palo Alto Networks, Inc. and/or using another commercially or publicly available URL categorization solution/service).

At 708, identifying the site as a phishing site based on the advanced application identification and the another IP/other feature is performed. For example, policy enforcement can include blocking the session from accessing the phishing site, logging the attempted access to the phishing site, monitoring and logging access to the phishing site, warning a user prior to allowing access to the phishing site, and/or other actions/responses or combinations thereof can be performed based on the policy (e.g., phishing/security policy, which can be stored in policies 252 as shown in FIG. 2B).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
monitor network activity associated with a session to detect a request to access a site;
determine advanced application identification associated with the site, comprising to:
perform the following:
A) determine an IP address range of an expected target site based on a website associated with the expected target site;
determine whether an IP address of the site falls within the IP address range of the expected target site, comprising to:
determine whether the IP address of the site resolves to an IP address owned by the expected target site; and
in response to a determination that the IP address of the site does not resolve to the IP address owned by the expected target site, determine that the IP address of the site does not fall within the IP address range of the expected target site; and
in response to a determination that the IP address of the site falls outside the IP address range of the expected target site, determine that the site is a potential phishing site; and
B) determine whether a domain of the site is a newly registered domain (NRD) and the site is visually similar to a well-known similar site, wherein the well-known similar site is a top 10000 site by traffic, wherein the well-known similar site is a legitimate site, wherein the NRD has been registered less than or equal to a predetermined threshold time; and
in response to a determination that the domain of the site is the NRD and the site is visually similar to the well-known site, determine that the site is a potential phishing site; and
identify the site as a phishing site based on the advanced application identification; and
a memory coupled to the processor and configured to provide the processor with instructions.

2. The system of claim 1, wherein the advanced application identification includes a protocol identification.

3. The system of claim 1, wherein the advanced application identification includes a protocol identification that identifies the phishing site based at least in part on a URL category, wherein the URL category is selected using a URL categorization based on an extracted domain associated with the request to access the site.

4. The system of claim 1, wherein the advanced application identification includes a site similarity identification.

5. The system of claim 1, wherein the advanced application identification includes a site similarity identification to determine whether the request for the site is visually similar to a well-known site.

6. The system of claim 1, wherein the advanced application identification includes a protocol identification and a site similarity identification.

7. The system of claim 1, wherein detecting the site as a phishing site is performed inline using a data appliance.

8. The system of claim 1, wherein the processor is further configured to determine a URL category associated with the request for the site to compare with an expected URL category associated with the well-known similar site based on a site similarity analysis.

9. A method, comprising:
monitoring network activity associated with a session to detect a request to access a site;
determining advanced application identification associated with the site, comprising:
performing the following:
A) determining an IP address range of an expected target site based on a website associated with the expected target site;

determining whether an IP address of the site falls within the IP address range of the expected target site, comprising:
  determining whether the IP address of the site resolves to an IP address owned by the expected target site; and
  in response to a determination that the IP address of the site does not resolve to the IP address owned by the expected target site, determining that the IP address of the site does not fall within the IP address range of the expected target site; and
in response to a determination that the IP address of the site falls outside the IP address range of the expected target site, determining that the site is a potential phishing site; and
B) determining whether a domain of the site is a newly registered domain (NRD) and the site is visually similar to a well-known similar site, wherein the well-known similar site is a top 10000 site by traffic, wherein the well-known similar site is a legitimate site, wherein the NRD has been registered less than or equal to a predetermined threshold time; and
in response to a determination that the domain of the site is the NRD and the site is visually similar to the well-known site, determining that the site is a potential phishing site; and
identifying the site as a phishing site based on the advanced application identification.

10. The method of claim 9, wherein the advanced application identification includes a protocol identification.

11. The method of claim 9, wherein the advanced application identification includes a protocol identification that identifies the phishing site based at least in part on a URL category, wherein the URL category is selected using a URL categorization based on an extracted domain associated with the request to access the site.

12. The method of claim 9, wherein the advanced application identification includes a site similarity identification.

13. The method of claim 9, wherein the advanced application identification includes a site similarity identification to determine whether the request for the site is visually similar to a well-known site.

14. The method of claim 9, wherein the advanced application identification includes a protocol identification and a site similarity identification.

15. The method of claim 9, wherein detecting the site as a phishing site is performed inline using a data appliance.

16. A computer program product embodied in a non-transitory computer readable medium and comprising computer instructions for:
monitoring network activity associated with a session to detect a request to access a site;
determining advanced application identification associated with the site, comprising:
  performing the following:
    A) determining an IP address range of an expected target site based on a website associated with the expected target site;
      determining whether an IP address of the site falls within the IP address range of the expected target site, comprising:
        determining whether the IP address of the site resolves to an IP address owned by the expected target site; and
        in response to a determination that the IP address of the site does not resolve to the IP address owned by the expected target site, determining that the IP address of the site does not fall within the IP address range of the expected target site; and
      in response to a determination that the IP address of the site falls outside the IP address range of the expected target site, determining that the site is a potential phishing site; and
    B) determining whether a domain of the site is a newly registered domain (NRD) and the site is visually similar to a well-known similar site, wherein the well-known similar site is a top 10000 site by traffic, wherein the well-known similar site is a legitimate site, wherein the NRD has been registered less than or equal to a predetermined threshold time; and
      in response to a determination that the domain of the site is the NRD and the site is visually similar to the well-known site, determining that the site is a potential phishing site; and
identifying the site as a phishing site based on the advanced application identification.

17. The computer program product of claim 16, wherein the advanced application identification includes a protocol identification.

18. The computer program product of claim 16, wherein the advanced application identification includes a site similarity identification.

* * * * *